United States Patent [19]
Kaplan et al.

[11] Patent Number: 5,256,868
[45] Date of Patent: Oct. 26, 1993

[54] CONTACT SCANNERS FOR SCANNING IMAGES OF AN ILLUMINATED FILM ONTO A PHOTOSENSOR ARRAY

[75] Inventors: Martin C. Kaplan, Rochester; James R. Milch, Pittsford; Clarke K. Eastman, Rochester, all of N.Y.

[73] Assignee: Eastman Kodak Company, Rochester, N.Y.

[21] Appl. No.: 880,776

[22] Filed: May 11, 1992

[51] Int. Cl.$^5$ .............................. H01J 40/14
[52] U.S. Cl. .................. 250/208.1; 250/227.20
[58] Field of Search ............. 250/208.1, 227.20; 358/214, 213.27, 484, 482, 483

[56] References Cited

U.S. PATENT DOCUMENTS

| | | | |
|---|---|---|---|
| 3,210,462 | 10/1965 | Trott | 178/6 |
| 3,663,750 | 5/1972 | Besier | 178/7.2 |
| 3,798,355 | 3/1974 | Miyaoka et al. | 178/5.4 CD |
| 4,038,493 | 7/1977 | Richards | 178/15 |
| 4,199,781 | 4/1980 | Doumit | 358/83 |
| 4,338,634 | 7/1982 | Dillon et al. | 358/214 |
| 4,377,753 | 3/1983 | Mir | 250/208.1 |
| 4,408,230 | 10/1983 | Tamura et al. | 358/213 |
| 4,427,994 | 1/1984 | Aron et al. | 358/54 |
| 4,485,485 | 11/1984 | Smith | 382/65 |
| 4,558,255 | 12/1985 | Genovese et al. | 250/227.2 |
| 4,660,095 | 4/1987 | Cannella et al. | 358/294 |
| 4,674,834 | 6/1987 | Margolin | 350/96.25 |
| 4,721,851 | 1/1988 | Kogure | 250/227 |
| 4,748,680 | 5/1988 | Margolin | 382/65 |
| 4,768,819 | 11/1988 | Tei | 250/578 |
| 4,777,534 | 10/1988 | Yaniv et al. | 358/294 |
| 4,812,646 | 3/1989 | Waszkiewicz | 250/227.2 |
| 4,868,664 | 9/1989 | Zvi et al. | 358/213.13 |
| 4,918,304 | 4/1990 | Gordon | 250/227.26 |
| 4,942,481 | 7/1990 | Yoshinouchi et al. | 358/471 |
| 5,032,718 | 7/1991 | Murakami | 250/227.20 |

FOREIGN PATENT DOCUMENTS 2027651 12/1971 Fed. Rep. of Germany ...... 178/233

*Primary Examiner*—David C. Nelms
*Assistant Examiner*—Que T. Le
*Attorney, Agent, or Firm*—David M. Woods

[57] ABSTRACT

Film contact scanners are provided which irradiate a first surface of a film with a light source, and receive an image of the film from a second side of the film at an array of photosensors. In a first embodiment, the array of photosensors is disposed adjacent the film so that each photosensor receives light from a separate point on the film. In a second embodiment, a bundle of optical fibers is disposed between the film and the array of photosensors. A gap is provided between the film and a first end of the bundle of optical fibers. Each photosensor receives the light from one or more of optical fibers for producing a predetermined MTF. In the second embodiment, a portion of the film between the light source and the bundle of optical fibers is formed in a cylindrical shape. A linear direction of the cylindrical shape is oriented to permit the photosensors to scan the film in a first direction. The film is moved past the bundle of optical fibers in the direction of the curve of the film for scanning the film in a second orthogonal direction. The light source includes either a diffuse illuminator or a specular illuminator. Alternatively, the film is sandwiched between a plate of transparent material, disposed adjacent a first side of the film closest to the source of light, and an area fiber optic for maintaining the film in a substantially flat orientation.

19 Claims, 6 Drawing Sheets

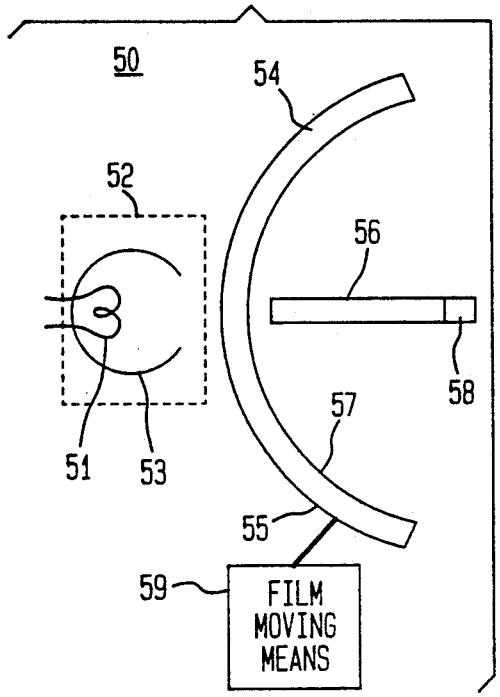
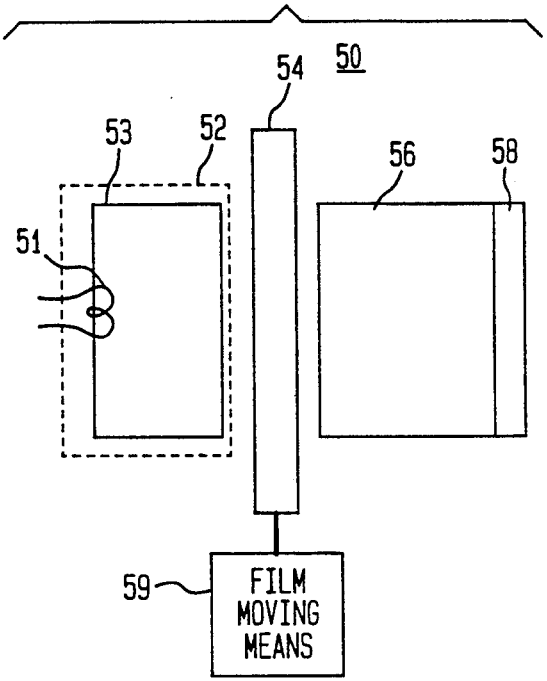
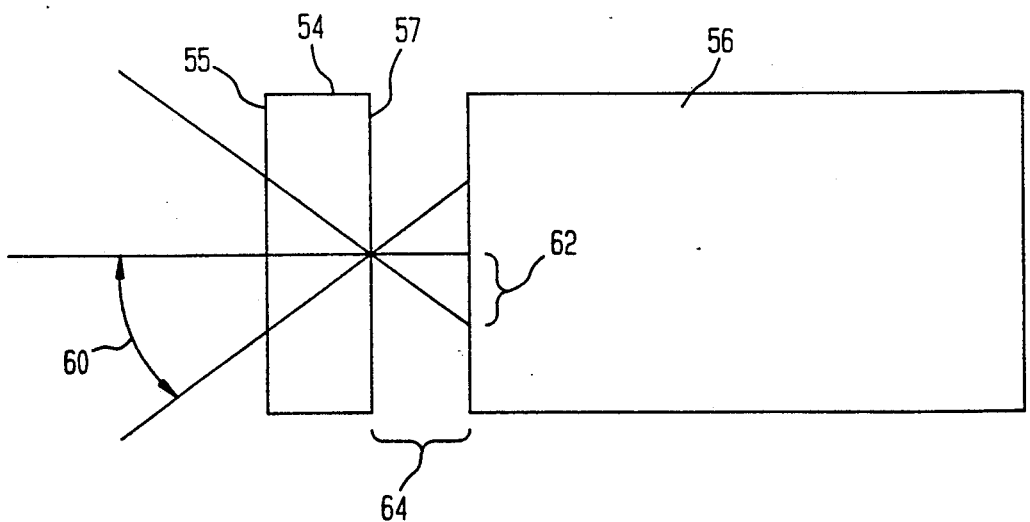

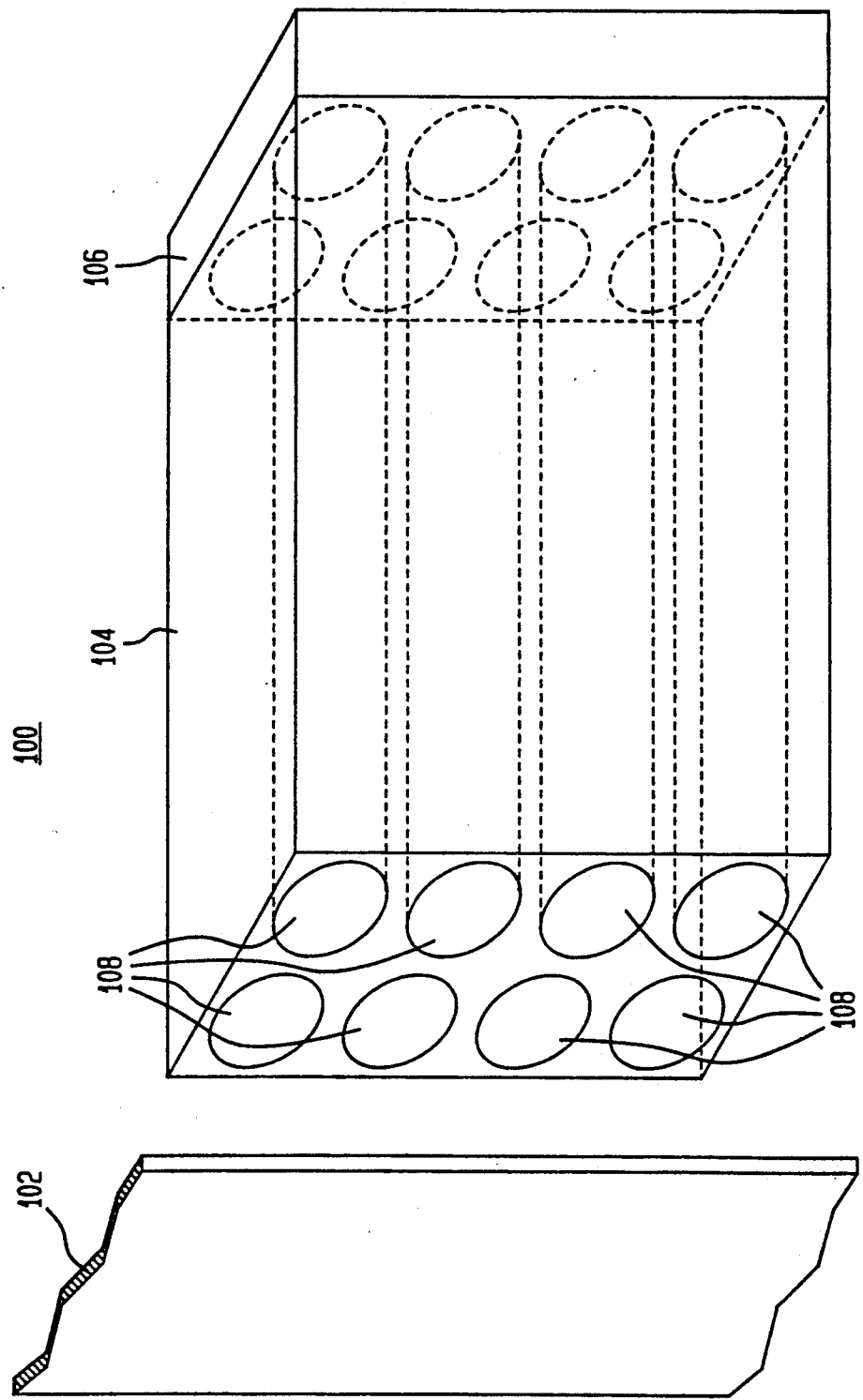

CONTACT SCANNERS FOR SCANNING IMAGES OF AN ILLUMINATED FILM ONTO A PHOTOSENSOR ARRAY

FIELD OF THE INVENTION

The present invention relates to contact scanners, and, more particularly, to improved contact type scanners for scanning images formed from an illuminated film.

BACKGROUND OF THE INVENTION

Scanners are used to convert an image of a document or a photographic film into corresponding electrical signals. The electrical signals are, for example, then digitally stored and manipulated by a computer or other device.

U.S. Pat. No. 4,408,230 (K. Tamura et al.), issued on Oct. 4 1983, discloses a photosensor array device for use in a document contact scanner. The Tamura et al. patent discloses as prior art an arrangement comprising a fiber optic base that contacts the document to be read with a fiber optic bundle formed therein. Light reflected from the document being read passes through the fiber optic bundle and impinges a light sensing array formed on an opposing-side of the fiber optic base. The Tamura et al. patent states that such arrangement is not a practical solution, and describes a device wherein a metallic plate with predetermined spaced holes therein is sandwiched between the fiber optic base and a transparent insulating film mounting the light sensing array. The light sensing array receives light from the fiber optic bundle through the holes in the metallic plate.

U.S. Pat. No. 5,032,718 (S. Murakami), issued on Jul. 16, 1991, discloses a photosensor array and reader including hexagonal optical fiber bundles. The Murakami photosensor array is a similar array to that of FIG. 2 of U.S. Pat. No. 4,408,230 discussed above.

U.S. Pat. No. 4,942,481 (A. Yoshinouchi et al.), issued on Jul. 17, 1990, discloses a contact-tirpe image sensor for use in a document reader which is similar to the Tamura et al. patent described above. The Yoshinouchi image sensor comprises a substrate which contacts the document and includes a bundle of optical fibers embedded in, and passing through, the substrate. A light-absorbing substance is disposed along a fractional portion of the outer surfaces of the optical fibers in the area nearest the photodetectors. With such arrangement, light from a light source irradiates the document below the area of the light-absorbing substance, and light leakage from the fibers is absorbed in the area of the light-absorbing substance. Photodetectors are mounted on the substrate with a space therebetween to provide a predetermined modulation transfer function (MTF).

Contact scanners for scanning film differ in several ways which pose different design requirements. A first design requirement is that film contact scanners must include much higher resolution (about 10 times) than document contact scanners. This requirement makes many page (document) contact scanner techniques inadequate. A second design requirement is that film contact scanners are transmission devices which require that the film be illuminated from behind, whereas document contact scanners are reflection devices. This substantially changes the design criteria. A third design requirement is the realization that scratches in the film are a much more serious problem than with documents. Scratches are often ignored with document contact scanners. However, film contact scanners require careful design attention to deal with scratches. A fourth design requirement has to do with a realization that film is more fragile than paper documents. ? his requires more fragile handling of the film while avoiding contact therewith during the reading (scanning) process. Document contact scanners, on the other hand, are permitted to freely bring, for example, the paper document into contact with various surfaces of the document contact scanner.

Referring now to FIG. 1, there is shown a traditional prior art film scanner 10. The traditional film scanner 10 comprises an illumination source 12 (e.g., a lamp), illumination optics 14 for directing light from the illumination source 12 onto a film 16, collection optics 18 for collecting the light passing through the film and focusing an image of the film onto a light detector 19. The collection optics 18 are typically lenses which are necessary to re-focus the image of the film 16 onto a spaced-apart light detector 19. The light detector 19 comprises any suitable device such as a single photodetector, a linear photodetector array, or an area photodetector array.

U.S. Pat. No. 3,210,462 (T. Trott), issued on Oct. 5, 1965, discloses an electro-optical film-scanning system which is an alternative arrangement from that shown in FIG. 1. The disclosed film scanning system of Trott comprises a planar array of optical fibers and a scanning means. The optical fiber array has a flat end section adjacent the film and an arcuate end section adjacent the scanning means. The scanning means picks up light from each of the optical fibers in a sequence by rotating separate individual scanning elements. The prime purpose of the fiber optics is to convert the image of the scan line to a circular arc.

It is desirable to provide a contact-type film scanner which avoids unnecessary elements (e.g., the collection optics of FIG. 1), achieves scratch suppression in the film image, and provides both film flatness in the area of scanning and precise positioning of the film.

SUMMARY OF THE INVENTION

The present invention is directed to film contact scanners which are more compact than traditional film scanners and avoid the use of the collection lenses of the traditional scanners. A film contact scanner in accordance with a first embodiment of the present invention comprises a source of light for illuminating a portion of a first side of the film; and an array of a plurality of photosensors. The array of photosensors are disposed in a predetermined gapped relationship to a second side of the film opposing the first side of the film. Each photosensor is representative of a pixel of an image received from the film and receives light directly from a separate point on the film. In an alternative arrangement of the first embodiment a self focusing (SELFOC) lens array is disposed between the film and the array of photosensors.

In accordance with a second embodiment of the present invention, a contact scanner for scanning a film comprises a source of light for illuminating a first side of the film, a bundle of optical fibers, and an array of a plurality of photosensors. The bundle of optical fibers comprises a first end and a second opposing end. The first end of the bundle of optical fibers is disposed in a gapped relationship to a second side of the film opposing the first side of the film. Each optical fiber receives light from a separate point on the film. The array of photosensors is disposed adjacent the second end of the bundle of optical fibers. Each photosensor receives the light from at least one optical fiber of the bundle of optical fibers. The gaps between the film and the bundle of optical fibers, and between the bundle of optical fibers and the photosensor, provides a predetermined modulation transfer function (MTF).

In a first alternative version of the second embodiment of the present invention described above, the film is formed in a cylindrical shaped portion between the source of light and the bundle of optical fibers. The bundle of optical fibers has a rectangular shape and is aligned along a long edge of the rectangular shape to scan light emanating from the film in a first direction along a linearly oriented direction of the cylindrical shaped portion of film. Additionally, the film and the bundle of optical fibers are moved relative to each other along the curved cylindrical surface of the film to scan the film in a second direction orthogonal to the first direction of scan. Additionally, the source of light comprises either a diffuse illuminator or a specular illuminator.

In accordance with a second alternative version of the second embodiment described above, the film contact scanner further comprises a flat plate of transparent material disposed adjacent the first side of the film closest to the source of light, and an area fiber optic. The area fiber optic has a first side thereof disposed adjacent a second side of the film opposite the first side of the film and between the film and the bundle of optical fibers. The plate and the area fiber optic are used for maintaining the film therebetween in a substantially flat orientation. A second side of the area fiber optic is disposed adjacent to, and scanned by, a linear photosensor array, or by a rectangular shaped bundle of fiber optics (as mentioned above for the first alternative version) which is attached to the photosensor array. The gaps between the area fiber optic and the bundle of optical fibers, and between the bundle of optical fibers and the photosensors, provides a predetermined modulation transfer function (MTF).

The invention and its various advantages will be better understood from the following more detailed description taken with the accompanying drawings and claims.

BRIEF DESCRIPTION OF THE DRAWINGS

FIGS. 7 and 8 show a side and top cross-sectional view, respectively, of a film contact scanner in accordance with a first embodiment of the present invention;

FIG. 9 shows a top cross-sectional view of the section between the film and a linear fiber optic bundle of FIG. 8 for determining the gap therebetween in accordance with the present invention;

FIG. 14 shows a view in perspective of a film scanner including a self focusing (SELFOC) lens array in accordance with a fourth embodiment of the present invention.

The drawings are not necessarily to scale.

DETAILED DESCRIPTION

Figure 1:
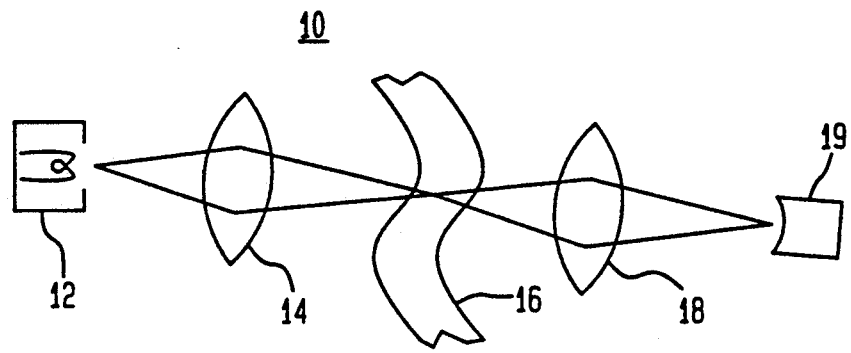
FIG. 1 shows a block diagram of a traditional prior art film scanner.
Figure 2:
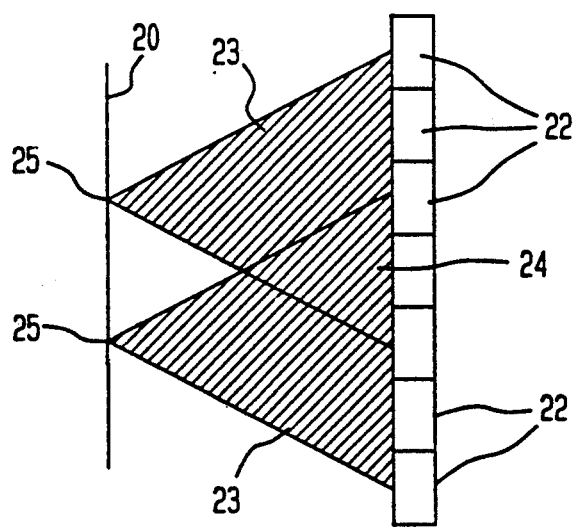
FIGS. 2 and 3 each show a diagram of an area between a film and a photosensitive detector array for providing background information of a film contact scanner.
Figure 3:
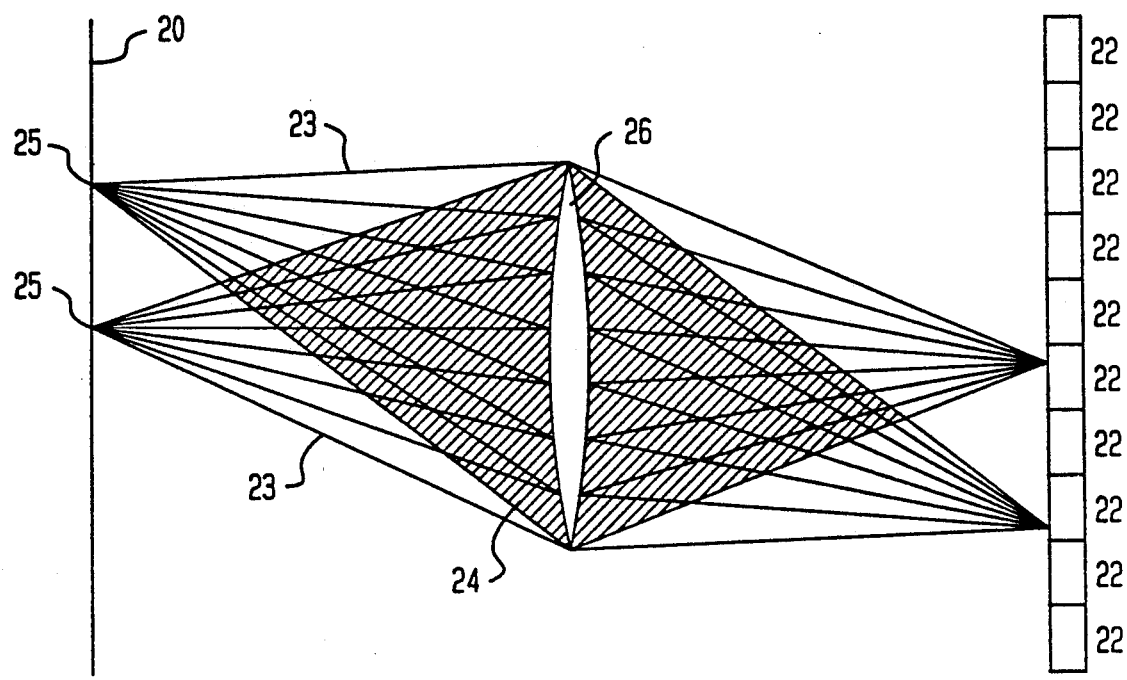
Figure 4:
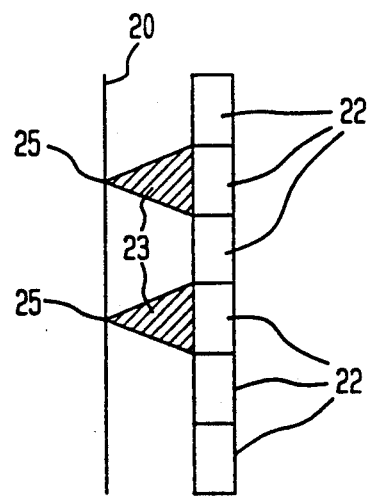
FIG. 4 shows a diagram of an area between a film and a photosensitive detector array for understanding a film contact scanner in accordance with the present invention.

Referring now to FIGS. 2, 3, and 4, each figure shows an area between a film 20 and a linear array of a plurality of Charge Coupled Devices (CCDS) 22 for providing an understanding of differences between the traditional prior art film scanner 10 of FIG. 1 and film contact scanners in accordance with the present invention which are described hereinbelow. It is to be understood that corresponding elements in each of the figures have been given the same designation number. As shown in FIG. 2, if the film 20 is placed in front of the array of CCDs 22 and illuminated by, for example, the illumination source 12 and illumination optics 14 of FIG. 1, each CCD 22 receives light from many sites 25 on the film 20. More particularly, a cone of light 23 emanating from each site 25 on the film 20 expands to impinge a detecting surface of many CCDs 22. Additionally, cones of light 23 from adjacent sites 25 on the film 20 form overlapping regions 24. Such overlapping regions 24 result in a blurring of the image of the film 20 at the CCDs 22. As shown in FIG. 3, to correct for such blurring of the film image, an objective lens 26 is used for the collection optics 18 of FIG. 1. The objective lens 26 functions to refocus the film image onto the array of CCDs 22.

FIG. 4 shows a diagram of an area between the film 20 and the array of CCDs 22 to facilitate an understanding of a film contact scanner in accordance with the present invention. As shown in FIG. 4, if the array of CCDs 22 is positioned sufficiently close to the film 20, there is no need for using the objective lens 26 of FIG. 3 to prevent blurring. The closer the array of CCDs 22 is placed to the film 20, the less blurring of the film image occurs since each film site 25 contributes to fewer, and finally only one, CCD site 22. Therefore, film contact scanners in accordance with the present invention, to be described hereinbelow, use the proximity of a light collection arrangement to the film 20 to eliminate the need for collection (objective) lenses.

Figure 5:
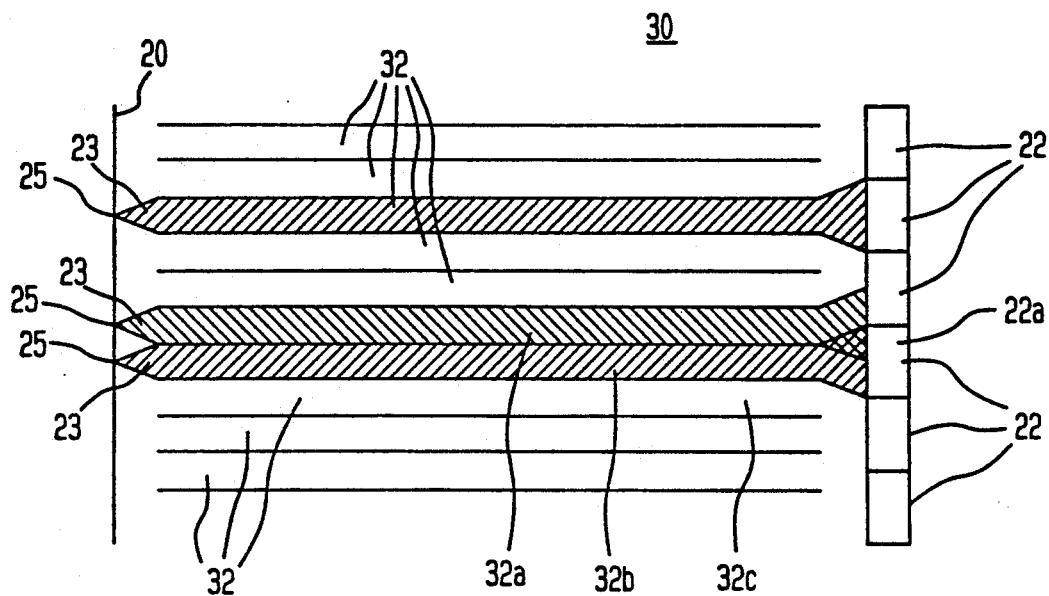
FIG. 5 shows a diagram of an area between a film and a photosensitive detector array of a general arrangement of a film contact scanner in accordance with the present invention.

Referring now to FIG. 5, there is shown a section of a film contact scanner 30 between a film 20 and an array of CCDs 22 comprising a coherent bundle of optical fibers 32 in accordance with the present invention. In the film contact scanner 30, first ends of the optical fibers 32 are placed in close proximity to the surface of the film 20 so that a cone of light 23 emanating from each film site 25 enters a separate optical fiber 32. The array of CCDs 22 are placed in close proximity to second ends of the optical fibers 32 so that light diverging from each optical fiber 32 impinges the array of CCDS 22 with a predetermined diameter. The use of the bundle of optical fibers 32 between the film 20 and the array of CCDs 32 permits a greater separation between the film 20 and the array of CCDs 22 while accurately controlling the overlapping of light from various film sites 25 (in the manner shown in FIG. 2).

For purpose of illustration and simplicity of explanation hereinbelow, the diameter of the light impinging the array of CCDs 22 from each optical fiber 32 is shown in FIG. 5 to be approximately the size of each CCD 22. If the optical fibers 32 are round, and the bundle of optical fibers 32 is a three-dimensional structure instead of the two-dimensional structure shown in FIG. 5, then the closest such fibers 32 can be packed is in a well-known hexagonal close-packed pattern. Therefore, the view in FIG. 5 of the bundle of optical fibers 32 is essentially a view in cross-section through a hexagonal close-packed pattern of fibers. It is to be understood that other packing geometries are also possible as, for example, square packing of square optical fibers.

There are two different ways that the bundle of optical fibers 32 disposed either linearly or in the hexagonal close-packed pattern can be oriented. A first way is to align the optical fibers 32 with the CCDs 22 as shown in FIG. 5, and a second way is to randomly arrange the optical fibers 32 relative to the CCDs 22 (not shown in the figures but is explained hereinbelow). In the first way as shown in FIG. 5, the optical fibers 32 are essentially aligned with the CCDs 22 even though, in end-surface width, there are two optical fibers 32 for each CCD 22. More particularly, the combined width of, for example, optical fibers $32_a$ and $32_b$ corresponds to the width of CCD $22_a$, with the optical fiber $32_b$ being aligned with the CCD $22_a$. Similarly, each of the other CCDs 22 has an optical fiber 22 aligned therewith. Therefore, the CCD $22_a$ receives the entire light emanating from the optical fiber $32_b$, and half of the light emanating from the optical fiber $32_a$. Additionally, the CCD $22_a$ receives half of the light emanating from optical fiber $32_c$. In other words, in a two-dimensional arrangement, each CCD 22 receives a same optical fiber light pattern comprising the light from a central fiber (e.g., $32_b$) and half of the light from two opposing fibers (e.g., $32_a$ and $32_c$).

Reception of light in this manner, from more than one film site 25 at each of the CCDs 22, introduces a blurring of the image from the film 20, and has the effect of reducing the Modulation Transfer Function (MTF). As is well known in the art, MTF is a measure of sharpness, where an increase in MTF indicates an increase in the sharpness of an image. More particularly, for a given spatial modulation frequency, the MTF provides a value of how effectively an image is transferred, and how much the modulation is reduced. MTF essentially is a ratio of modulation from the output (of the film 20) over the input (to the CCDs 22) for various spatial frequencies. Therefore, MTF is a function of frequency, and a curve relating to MTF is generally plotted as a function of frequency rather than MTF being a single number indicative of an overall measurement.

It is to be understood that the film contact scanner 30 also comprises a light source (not shown) with or without illumination optics (not shown) disposed in a spaced-apart relationship with the side of the film 20 opposite the bundle of optical fibers 32 in the manner shown in FIG. 1.

In an alternative arrangement (not shown) of the film contact scanner 30, each CCD 22 has a size which is a predetermined mixed number (e.g., 4.1) times the size of each of the optical fibers 32. For the exemplary size of 4.1 optical fibers 32 for each CCD 22, certain CCDs 22 receive light from four optical fibers 32 disposed directly in front of the CCD, plus a predetermined fraction of the light from each adjacent optical fiber 32 disposed around the four optical fibers 32. Further down the array of CCDs 22, the optical fiber pattern shifts relative to the CCD pattern, and a CCD receives light from, for example, three fibers directly in front of the CCD plus slightly more than half of the light from each of the optical fibers 32 disposed around the three optical fibers. The mixed number ratio (e.g., 4.1:1) of optical fibers 32 to CCD 22 represents the hereinbefore-mentioned second way of randomly arranging the optical fibers 32 in a pattern which is skewed relative to the pattern of CCDs 22.

Figure 6:
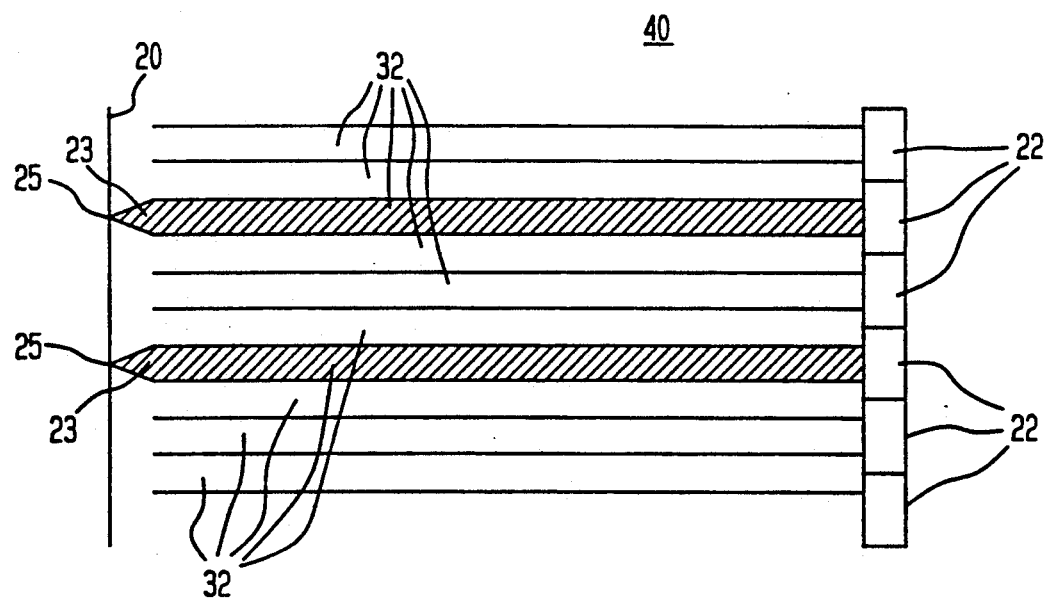
FIG. 6 shows a diagram of an area between a film and a photosensitive detector array of a preferred general arrangement of a film contact scanner in accordance with the present invention.

Referring now to FIG. 6, there is shown a section of a film contact scanner 40 in accordance with the present invention which is an alternative arrangement to the corresponding section of the film contact scanner 30 of FIG. 5. The difference between the film contact scanner 30 and the film contact scanner 40 is that the spacing between the ends of the optical fibers 32 and the array of CCDs 22 has been eliminated in the film contact scanner 40. For the above-discussed exemplary CCD 22 size of two times the optical fiber 32 size, or the exemplary CCD 32 size of 4.1 times the optical fiber size 32, the same result occurs as discussed hereinabove for the film contact scanner 30 of FIG. 5. More particularly, each CCD 32 receives the light from at least one optical fiber 32 plus light from the adjacent surrounding optical fibers 32.

Referring now to FIGS. 7 and 8, there is shown a side cross-sectional view (FIG. 7) of a "curved gate" film contact scanner 50, and a top cross-sectional view (FIG. 8) of the "curved film" film contact scanner 50 in accordance with a first embodiment of the present invention. The curved film gate scanner 50 comprises a diffuse illumination source 52 (shown within a dashed-line rectangle), a film 54, a linear bundle 56 of optical fibers (shown within a solid-line block), and a linear array 58 of CCDs (shown within a solid-line block). The illumination source 52 comprises a light source 51 and a diffuser 53. It is to be understood that the diffuser 53 comprises any suitable device. For example, diffuser 53 can comprise a condenser lens (not shown) as is well known in the art, or a light housing (as shown in FIGS. 7 and 8) having a slot therein. With a light housing arrangement comprising, for example, a white plastic cylinder, light from the light source 51 is introduced at one side of the light housing 53 and diffused therein. The diffused light then exits from a slot on the opposite side of the light housing to impinge a base side 55 the film 54.

The film 54 is cylindrically curved to force the film 54 to be linearly oriented in the non-curved direction. It is to be understood that any suitable means can be used to provide the cylindrical curvature of the film 54 as, for example, curved rails carrying the film 54. The film 54 is diffusely illuminated from the base side 55, and the linear fiber optic bundle 56 is placed very close to an emulsion side 57 of the film 54. The linear fiber optic bundle 56 receives the light from the film 54 from one entire line at a time. Additionally, the film 54 is drawn past the end of the linear fiber optic bundle 56 by a film moving means 59 to scan the film 54 in the orthogonal direction. The linear array 58 of CCDS is permanently bonded to the end of the linear fiber optic bundle 56 (opposite the end adjacent the film 54) for receiving the light from the one line of the film 54 at any instant of time.

Referring now to FIG. 9, there is shown a top cross-sectional view of the section between the film 54 and the linear fiber optic bundle 56 of FIG. 8 for determining a size of a gap 64 therebetween in accordance with the present invention. The critical dimension in the curved gate film contact scanner 50 of FIGS. 7 and 8 is the gap 64 between the film 54 and the adjacent end of the linear fiber optic bundle 56. Making the gap 64 larger reduces the MTF (increasing the blurring of the image), while making the gap 64 smaller risks contact with the film 54.

To determine typical gap 64 dimensions in FIG. 9, it is assumed that 12 micrometer square pixels are disposed on the film 54 (providing approximately 2000 pixels across the film), and the diffuse illumination covers a forty-five degree half-angle 60 to provide good scratch suppression. More particularly, it is a known effect that if there are scratches on the base side 55 of the film 54 and the film is diffusely illuminated, the scratches are not observed by the human eye. Additionally, to avoid the known effect of aliasing, it is desirable that the image received by the array 58 of CCDs be slightly blurred (a slightly reduced MTF). If a twelve micrometers of blurring is permitted as represented by a twelve micrometer half-width dimension 62, then by the geometry of the arrangement of the film 54 and the linear fiber optic bundle 56, the film 54 to fiber optic bundle 56 should have a gap 64 of approximately twelve micrometers. It is to be understood that the dimension of twelve micrometers of gap 64 is only a rough estimate of the required gap.

The gap 64 of a predetermined exemplary dimension of twelve micrometers is achieved as follows. The cylindrical curvature of the film 54 provides a substantially linear orientation of a surface of the film 54 in the non-curved direction. This linear orientation of the film 54 can in practice be made much better than the exemplary twelve micrometers of the gap 64. With modern technology, the end of the linear fiber optic bundle 56 can also be ground and polished flat to much better than the exemplary twelve micrometers. It is to be understood that any suitable means can be used to maintain a gap 64 of the exemplary twelve micrometers. For example, (a) simple mechanical means such as components (not shown) which are machined to hold the film 54 and the fiber optic bundle 56 twelve micrometers apart, (b) active mechanical means with feedback signaling (not shown) for sensing the gap 64 and moving the fiber optic bundle 56 to maintain the twelve micrometers, (c) clear slip sheets (not shown) twelve micrometers thick disposed between the film 54 and the fiber optic bundle 56, or (d) streams of a gas between the film 54 and the fiber optic bundle 56 to force them apart by the gas flow can be used.

A further issue for the curved gate film contact scanner 50 of FIGS. 7 and 8 is the flatness of the linear array 58 of CCDS. Such flatness is an issue because gaps between the end of the fiber optic bundle 56 and the linear array 58 of CCDs adds to the blurring effect at the various CCDS. Therefore, any suitable technique for avoiding gaps between the end of the fiber optic bundle 56 and the linear array 58 of CCDs can be used. One such technique is to use a flat ground fiber optic bundle, a flat CCD, and a thin layer of optical quality epoxy between the fiber optic bundle and the CCD. The high index of refraction of the optical quality epoxy reduces the effective optical distance between the fiber optic bundle and the CCD.

Figure 10:
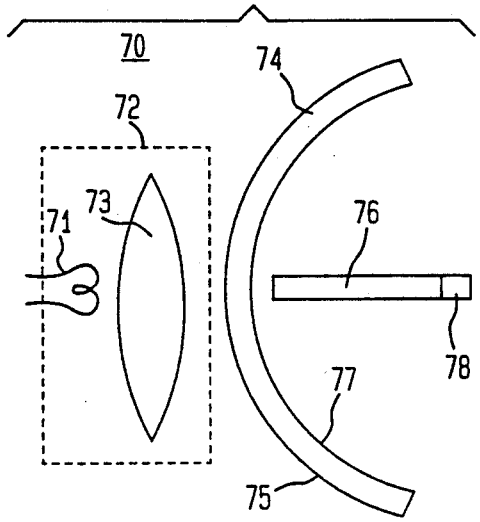
FIGS. 10 and 11 show a side and top view, respectively, of a film contact scanner in accordance with a second embodiment of the present invention.
Figure 11:
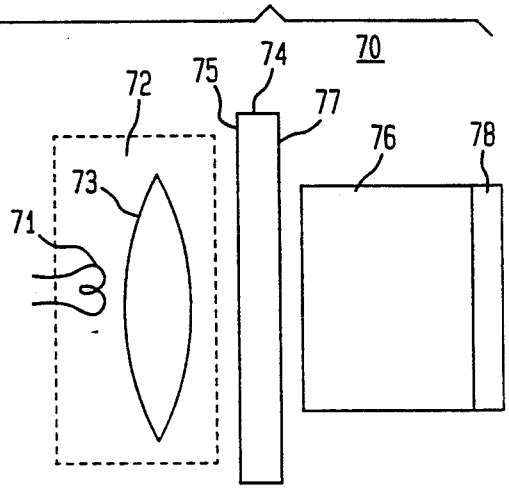

Referring now to FIGS. 10 and 11, there is shown a side cross-sectional view (FIG. 10) of a "curved gate/inverted film" contact scanner 70, and a top cross-sectional view (FIG. 11) of the "curved gate/inverted film" contact scanner 70 in accordance with a second embodiment of the present invention. The curved gate/inverted film contact scanner 70 comprises a specular illumination source 72 (shown within a dashed line rectangle), a film 74 with an emulsion side 75 and a base side 77, a linear bundle 76 of optical fibers (shown within a solid-line rectangle), and a linear array 78 of CCDs (shown within a solid-line rectangle). The film contact scanner 70 is similar to the film contact scanner 50 of FIGS. 7 and 8 except that the specular illumination source 72 replaces the diffuse illumination source 52 of FIGS. 7 and 8, and the emulsion and base sides of the film 74 are reversed from the arrangement of FIGS. 7 and 8. Therefore, in the film contact scanner 70, an emulsion side 75 of the film 74 is irradiated with specular light from the specular illumination source 72, and the linear fiber optic bundle 76 is positioned adjacent the base side 77 of the film 74. The specular illumination source 72 comprises a light source 71 and a lens 73 which functions to provide an angle of illumination at the film 74 that is small in comparison to light from a diffuse light source. For an exemplary specular illumination half-angle (e.g., angle 60 in FIG. 9) of five degrees (instead of the diffuse angle of forty-five degrees as provided by the film contact scanner 50 of FIGS. 7 and 8), to achieve twelve micrometers of blurring (as represented by a twelve micrometer half-width dimension 62 in FIG. 9), a gap between the emulsion side 75 of the film 74 and the adjacent end of the fiber optic bundle 76 is 140 micrometers. Since film is typically 130 micrometers thick, the film 74 is positioned with the emulsion side 75 away from the fiber optic bundle 76, leaving a small gap between the base side 77 of the film 74 and the fiber optic bundle 76. For a drawing equivalent to FIG. 9 for the film contact scanner 70, FIG. 9 would have to be modified so that the focussing of narrow angle rays of light from the specular illumination source 72 occurs at the base side 75 of the film 74 closest to the illumination source 72, rather than at the emulsion side 77 of the film 74 closest to the fiber optic bundle 76.

There are several advantages to the "curved gate/inverted film" contact scanner 70. A first advantage is that with specular illumination more of the light exiting the film 74 is captured by the bundle 76 of optical fibers and, in turn, the array 78 of CCDS. This provides better efficiency. A second advantage is that specular illumination is achieved more efficiently because diffusers are not needed as part of the illumination optics. A third advantage is that accidental contact between the film 74 and the fiber optic bundle 76 is much less troublesome with the film base 77 disposed adjacent the end of the fiber optic bundle 76. This results in less potential damage occurring since the base 77 of the film 74 is more durable than the emulsion side 75, and because the base side 77 is optically less important than the emulsion side 75. A disadvantage of using specular illumination is that it does not provides scratch suppression as provided with diffuse illumination. However, by using fiber optics of a high numerical aperture (i.e., they capture light over a wide range of angles, similar to a large aperture lens), if the gap between the film base 77 and the fiber optic bundle 76 is kept small, scratch suppression is achieved. This occurs because scratches on the base side 77 of the film 74 scatter (i.e., deflect) the light but do not absorb the light. The optical fibers in the bundle 76 still capture most of this scattered light. More particularly, the small distance between the base side 77 of the film 74 and the fiber optic bundle 76 cabses the optical fibers to capture most of the scattered light close to the original position of the scratch. Thus the scratch has little effect. It is to be understood that most scratches are found on the base side 77 of the film 74 (rather than the emulsion side 75) because film is generally handled in a manner to preferentially protect the emulsion side 77. Such handling of the emulsion side is also important for scratch suppression in the case of diffuse illumination, since even diffuse illumination cannot suppress scratches which have removed film emulsion.

Figure 12:
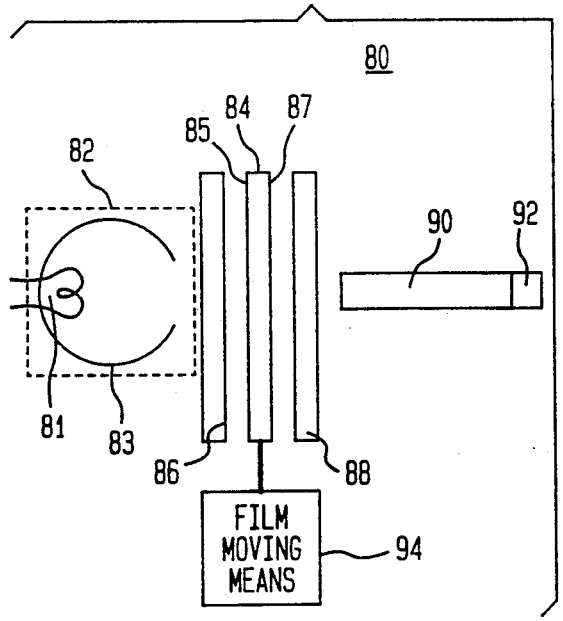
FIGS. 12 and 13 show a side and top cross-sectional view, respectively, of a film contact scanner in accordance with a third embodiment of the present invention.
Figure 13:
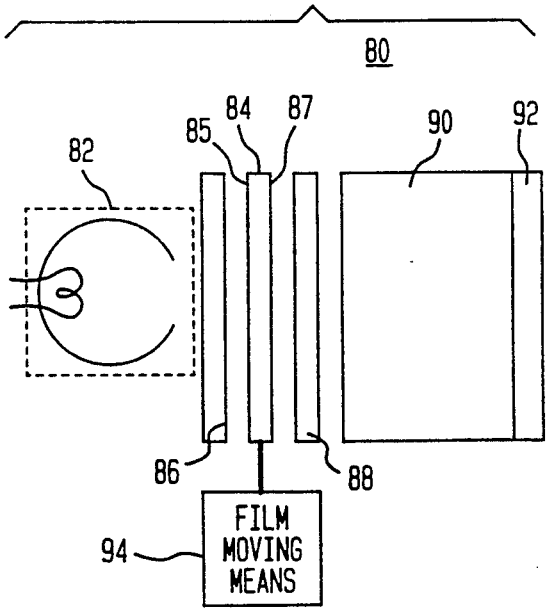

Referring now to FIGS. 12 and 13, there is shown a side cross-sectional view (FIG. 12) of a "Flat Gate" film contact scanner 80 and a top cross-sectional view (FIG. 13) of the "Flat Gate" film contact scanner 80 in accordance with a third embodiment of the present invention. The flat gate film contact scanner 80 comprises a diffuse illumination source 82 (shown within a dashed line rectangle), a film 84 comprising an base side 85 and a emulsion side 87 disposed between a transparent or translucent (e.g., glass) plate 86 and an area fiber optic 88, a linear bundle 90 of optical fibers (shown within a solid-line rectangle), and a linear array 92 of CCDs (shown within a solid-line rectangle). The diffuse illumination source 82 comprises a a light source 81 and a diffuser 83 corresponding to the light source 51 and diffuser 53 of the curved gate film contact scanner 50 of FIGS. 7 and 8.

Flatness of the film 84 is achieved by sandwiching the film 84 between the flat areas of the transparent or translucent (e.g., glass) plate 86 and the area fiber optic 88. The area fiber optic 88 is preferably sufficiently large to fit an entire frame of the film 84 at one time. Additionally, the combination of the transparent or translucent plate 86, the film 84, and the area fiber optic 88 is scanned past the linear fiber optic bundle 90 by a film moving means 94 to provide scanning in the orthogonal direction to the linear array 92 of CCDS. Introduction of the area fiber optic 88 permits a gap between the film 84 and the linear fiber optic bundle 90, while preventing blurring of the image projected from the film 84. Preferably, the area fiber optic 88 and the adjacent end of the linear fiber optic bundle 90 are polished very flat permitting them to be positioned close to each other without actually making contact during scanning. It is to be understood that the introduction of the area fiber optic 88 causes problems with well know Moire patterns, which are interactions between the positions of the optical fibers in both the area fiber optic 88 and the fiber optic bundle 90. The effect of the Moire pattern is minimized by (a) careful orientation of the area fiber optic 88 and the fiber optic bundle 90 to control the amplitude and frequency of the Moire pattern, (b) selecting optical fiber sizes of the area and linear fiber optics to control the amplitude and frequency of the Moire patterns, (c) using fiber optics with large fill factors, and (d) adjusting the gap between the area and linear fiber optics. It is usually preferable to make the Moire patterns low amplitude and high frequency. It is to be understood that the "Flat Gate" film contact scanner 80 is adaptable to scanning both strips and single frames (such as slides) of a film 84.

Referring now to FIG. 14, there is shown a view in perspective of a film scanner 100 comprising a self focusing (SELFOC) lens array 104 disposed between a film 102 and a CCD array 106 in accordance with a fourth embodiment of the present invention. The SELFOC lens array 104 is an array of inexpensive gradient index lenses 108 which are cemented together. This provides an inexpensive alternative to the objective lens 26 of FIG. 3 or the collection optics of FIG. 1. In accordance with the fourth embodiment, the well known SELFOC lens array 102 is altered to improve its imaging properties and permit its use in a film scanner. More particularly, the length of the individual lenses 108 of the SELFOC lens array 104 is modified relative to lengths found in a well known SELFOC lens array. This change in length decreases the numerical aperture (i.e., accepts a smaller angular range of light), which in turn decreases the number of individual lenses 108 participating in the imaging of a single point of the film emulsion (not shown), ultimately to a single participating lens. It is to be understood that a currently found poor imaging quality of the well known SELFOC lens array is caused mainly by mismatches between the individual lenses 108. The present alteration of length of the individual lenses 108 improves the image quality at the CCD array 106.

It is to be appreciated and understood that the specific embodiments of the invention described hereinbefore are merely illustrative of the general principles of the invention. various modifications may be made by those skilled in the art which are consistent with the principles set forth. For example, the optical fibers in the bundle disposed between the film and the CCD array in each of the film contact scanners of the present invention can comprise any suitable means known in the art for transmitting the light received from the film at one end thereof to the CCD array disposed at the other end thereof in the manner described hereinbefore.

What is claimed is:

1. A contact scanner for scanning a film comprising:
   a source of light for illuminating a portion of a first side of the film;
   an array of a plurality of N photosensors disposed in a predetermined gapped relationship to a second side of the film opposing the first side of the film, each photosensor is representative of a pixel of an image received from the film and receives light directly from a separate point on the film without the use of an imaging lens system that images light from the illuminated portion of the film onto the array of photosensors, and
   means for moving the film relative to the array of photosensors.

2. The contact scanner of claim 1 further comprising an array of self focusing lens having a first end and a second opposing end disposed between the film and the array of photosensors such that the first end has a predetermined gapped relationship to a second side of the film and the second end is adjacent the array of photosensors, each self focusing lens comprising a length along a longitudinal axis thereof to provide a predetermined numerical aperture that accepts a substantially small angular range of light from the illuminated portion of the film.

3. The contact scanner of claim 1 further comprising:
a plate of transparent or translucent material disposed adjacent the first side of the film closest to the source of light;
a bundle of a plurality of M optical fibers comprising a first and a second opposing end where M≧N, the second end of the bundle of optical fibers is disposed adjacent the array of photosensors; and
an area fiber optic having a first side disposed adjacent the second side of the film opposite the first side of the film for maintaining the film in a substantially flat orientation, and a second side disposed to provide a predetermined gap with the first end of the bundle of optical fibers to produce a predetermined Modulation Transfer Function.

4. The contact scanner of claim 1 wherein each of the photosensors is a charge coupled device (CCD).

5. A contact scanner for scanning a film comprising:
a source of light for illuminating a portion of a first side of the film;
a bundle of a plurality of M optical fibers comprising a first and a second opposing end, the first end of the bundle of optical fibers is disposed in a gapped relationship to a second side of the film opposing the first side of the film with each optical fiber receiving light from a separate point on the film;
an array of a plurality of N photosensors disposed adjacent the second end of the bundle of optical fibers where M≧N, each photosensor is representative of a pixel of an image received from the film and receives light from at least one optical fiber to provide a predetermined amount of blurring of the image and produce a predetermined Modulation Transfer Function (MTF); and
means for moving the film relative to the bundle of the optical fibers.

6. The contact scanner of claim 5 wherein each of the photosensors is a charge coupled device (CCD).

7. The contact scanner of claim 5 wherein each photosensor receives light from a separate optical fiber of the bundle of optical fibers so as to minimize any blurring of the image and produce a maximum MTF.

8. The contact scanner of claim 5 wherein each photosensor receives the light from multiple optical fibers of the bundle of optical fibers to provide a predetermined amount of blurring of the image and produce the predetermined MTF.

9. The contact scanner of claim 8 wherein the second end of the bundle of optical fibers is disposed in contact with the photosensitive areas of array of photosensors.

10. The contact scanner of claim 5 wherein the second end of the bundle of optical fibers is disposed in a gapped relationship to the array of photosensors to provide a predetermined amount of blurring of the image and produce the predetermined MTF in combination with the blurring produced by the gapped relationship of the first end of the bundle of optical fibers and the film.

11. The contact scanner of claim 5 wherein:
the bundle of optical fibers has a rectangular shape with a long edge and a narrow orthogonal edge; and
a section of the film has a cylindrical shape between the source of light and the bundle of optical fibers, the bundle of optical fibers being aligned along the long edge of the rectangular shape to scan light emanating from the film in a first direction across a substantially linear portion of the cylindrical shape, and the film and the bundle of optical fibers are moved relative to each other along the curved cylindrical surface of the film to scan the film in a second direction orthogonal to the first direction of scan.

12. The contact scanner of claim 11 wherein each photosensor receives the light from a plurality of optical fibers of the bundle to provide a predetermined amount of blurring of the image and produce the predetermined MTF.

13. The contact scanner of claim 11 wherein the source of light comprises a diffuse illuminator comprising:
an illumination source for producing light; and
light diffusing means for diffusing the light over a predetermined wide angle.

14. The contact scanner of claim 13 where the film comprises:
a base side disposed towards the diffuse illuminator; and
an emulsion side disposed adjacent the first end of the bundle of optical fibers.

15. The contact scanner of claim 11 wherein the source of light is a specular illuminator comprising:
an illumination source for producing light; and
means for irradiating the film with a predetermined narrow angle of the light from the illumination source for producing the predetermined MTF.

16. The contact scanner of claim 15 wherein the film comprises:
an emulsion side disposed towards the specular illuminator; and
a base side disposed adjacent the first end of the bundle of optical fibers.

17. The contact scanner of claim 5 further comprising:
a plate of transparent or translucent material disposed adjacent the first side of the film closest to the source of light; and
an area fiber optic having a first side disposed adjacent a second side of the film opposite the first side of the film for maintaining the film in a substantially flat orientation, and a second side disposed adjacent the bundle of optical fibers to provide a predetermined gap with the first end of the bundle of optical fibers to produce the predetermined MTF.

18. The contact scanner of claim 17 wherein the light source is diffuse, and the film comprises:
a base side disposed adjacent the plate of transparent material; and
an emulsion side disposed adjacent the area fiber optic.

19. The contact scanner of claim 17 wherein the light source is specular, and the film comprises:
an emulsion side disposed adjacent the plate of transparent material; and
a base side disposed adjacent the area fiber optic.

* * * * *